United States Patent [19]

Borodulin et al.

[11] Patent Number: 4,552,125
[45] Date of Patent: Nov. 12, 1985

[54] PORTABLE SOLAR WATER HEATER

[76] Inventors: German Borodulin, 2518 Clement St., #4; Alexander Shkolnik, 4434 Fulton St., #2; Raphael Baron, 546 25th Ave., all of San Francisco, Calif. 94121

[21] Appl. No.: 658,811

[22] Filed: Oct. 9, 1984

[51] Int. Cl.[4] .............................................. F24J 3/02
[52] U.S. Cl. .................................. 126/437; 126/450
[58] Field of Search ........ 126/424, 426, 437, 446–448, 126/450

[56] References Cited

U.S. PATENT DOCUMENTS

| 4,055,162 | 10/1977 | Gonzalez | 126/447 |
| 4,127,104 | 11/1978 | Greene | 126/400 |
| 4,421,943 | 12/1983 | Withjack | 126/417 |

FOREIGN PATENT DOCUMENTS

2404815  4/1979  France ................................ 126/450

Primary Examiner—Carroll B. Dority Jr.
Attorney, Agent, or Firm—D. Pressman

[57] ABSTRACT

A combined table and portable solar water heater comprises a suitcase-like rigid casing (20) molded from a rigid plastic material which contains a pair of solar collector panels (38) and (38a) connected in series. The panels can be exposed to solar radiation when the casing is opened. Each collector panel (38) or (38a) is formed by a copper plate with the solar radiation absorbing surface and copper pipe coil (56) or (56a) in heat-transferring relationship with said copper plate. The casing is provided with compartments (40) and (40a) for accessories, such as adjustable legs (42a, 42b, etc.) for supporting the casing, adjusting its angle to incident sunlight, and for converting the casing into a table; containers for feeding cold water to the solar collector and for receiving hot water from the collector; and a tripod stand (86) for supporting the feeding container at the level above the collector and for arranging a shower set. Temperature-insulating layers (64, 64a) of the collectors are formed by separate pieces of rigid material which can be removed from the casing and assembled into a box-shaped container which can be utilized for maintaining water heated by means of the solar water heater at an elevated temperature.

23 Claims, 14 Drawing Figures

PORTABLE SOLAR WATER HEATER

BACKGROUND

1. Field of the Invention

The present invention relates to solar water heaters, particularly to a portable solar water heater which may be used by sportsmen, outdoor enthusiasts, geologists, and the like.

2. Description of Prior Art

Solar water heaters have long been known to be an efficient method for utilizing solar radiant energy to heat a liquid such as water for subsequent storage and use. With the presently rapidly increasing cost of conventional source or energy, such as electricity, gas, or fossil fuels, the role of solar water heaters is constantly increasing. However, among a great variety of types of solar water heating systems, only few of them are portable. Frequently a need arises for a portable and versatile solar water heater which can be easily transported to a remote or temporary location, disaster area, recreation area or to a similar place where there are no usual conveniences, such as furniture, electricity, and hot water.

Known in the art is a portable solar water heater such as described in U.S. Pat. No. 4,127,104 to M. Greene, issued Nov. 28, 1978. This heater comprises a tank which has a triangular transverse cross section, the hypotenuse of the triangule being closed by a wall which allows solar energy to pass into the contents of the tank. While this portable solar water heater can be utilized for water heating purposes, that is its sole use since it does not provide any other function which can otherwise be useful when the device is not used as a heater. Furthermore, this heater is inconvenient for transportation and storage since it occupies a large space.

OBJECTS AND ADVANTAGES OF THE PRESENT INVENTION

Accordingly several objects of the present invention are to provide a solar water heater which is portable, light in weight, simple to use, and simple to manufacture. Further objects are to provide such a heater which can be converted into a small or large table, can be used as a chess table or the like, can contain in its casing various accessories such as a shower head, collapsible chairs, table legs, etc. Additional objects are to provide such a heater with removable thermal insulation means which, when removed, can be assembled into a thermostatic casing for insulating the water heated by the solar water heater. Further objects and advantages of the present invention will become apparent from a consideration of the ensuing description and drawings.

PREFERRED EMBODIMENT OF THE INVENTION

Figure 1:
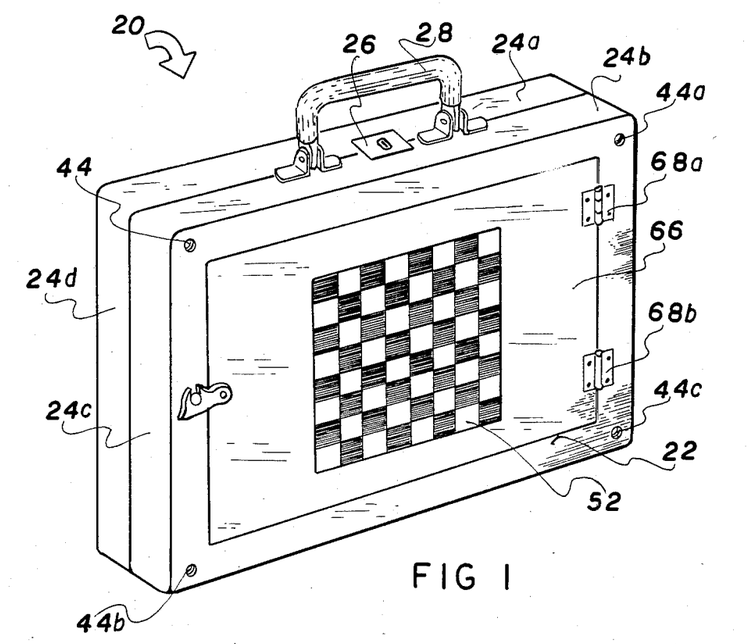
FIG. 1 is a general perspective view of a combined table and portable solar water heater in assembled state ready for storage and transportation.

A general perspective view of a portable solar water heater in position for storage and transportation is shown in FIG. 1. The heater has a casing 20, which is shown assembled for storage and transportation, and which looks like a suitcase with a rigid front wall 22, a back wall 22a (FIG. 3), side walls 24a, 24b, 24c, and 24d (the bottom and righthand side walls are not seen in FIG. 1), a lock 26, and a handle 28. Casing 20 can be molded from a light and rigid plastic material, stamped from a light aluminum alloy, or made of wood or plywood.

In FIG. 1 the dimensions of the folded unit are approximately $42'' \times 22'' \times 4\frac{1}{2}$. All of the other dimensions are sized approximately to the scale indicated.

Figure 2:
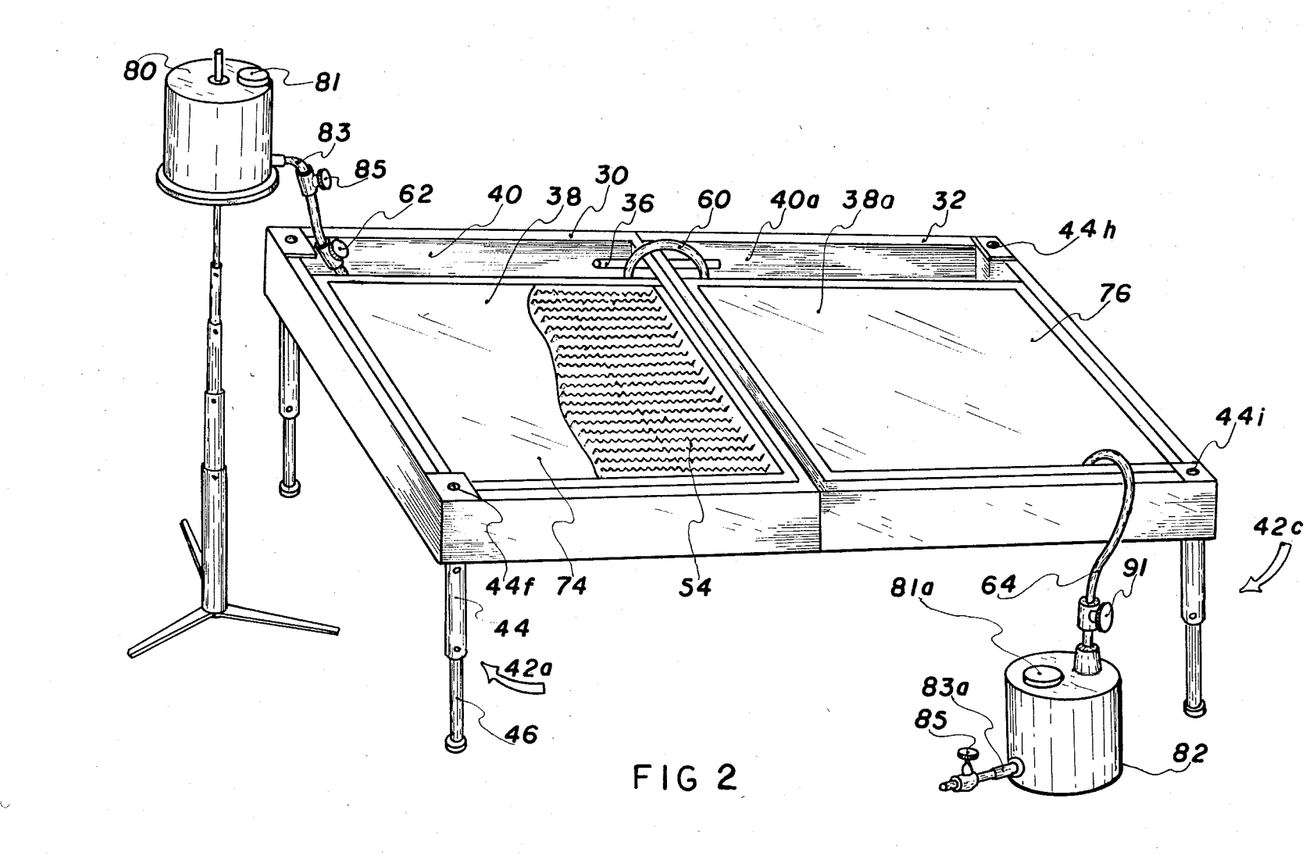
FIG. 2 is a perspective view of a portable solar water heater in its working position.

FIG. 2 is a perspective view of the solar water heater of FIG. 1 in its open or working position where it can receive and covert solar light energy to thermal energy. In this position, some internal parts of the device are shown. The two halves of the casing form a frame which consists of two parts 30 and 32 hinged at 34a, 34b, and 34c. A lock pin 36 (see FIG. 7) passes through aligned holes of parts 30 and 32 for interconnecting them, during the use of solar water heater, into an integral rigid frame. Both parts 30 and 32 are essentially identical. Each of them comprises a solar collector 38 or 38a and an accessory compartment 40 or 40a respectively. In the open or working position of solar water heater, collectors 38 and 38a are exposed to sunlight.

Figures 11, 12:
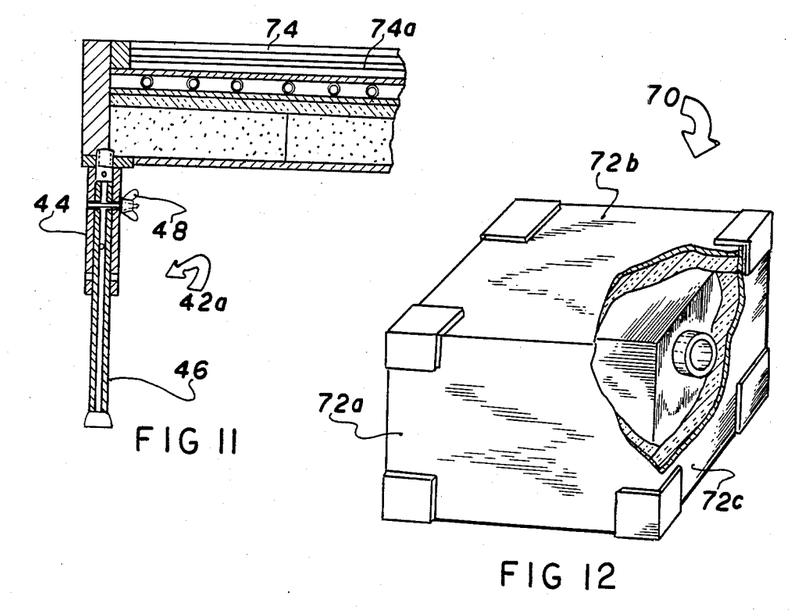
FIG. 11 is a cross-sectional view of an adjustable table leg.
FIG. 12 is a perspective partially-broken view of a temperature insulating casing assembled of pieces of the collector insulation layer.

The frame is supported by four legs 42a, 42b, 42c, and 42d. These legs are inserted into threaded recesses 45 formed at the bottom of the frame; see FIG. 11 for cross-sectional view of this part of the frame. The length of the legs may be adjustable. For example, as shown in FIG. 11, each leg may be formed by a pair of tubes 45 and 46, one of which (46) is telescopically inserted into another (45). The tubes are provided with a series of holes so that a lock pin 48 can be inserted through aligned holes of both tubes to lock the leg in any suitably adjusted length. As shown, the angular position of collectors 38 and 38a is adjusted so that they face the sun; this is done by making the legs on one side longer than those on the other side.

In the assembled, carrying position shown in FIG. 1, legs 42a, 42b, 42c, and 42d are located in storage compartments 40 and 40a of the casing. The remaining contents of storage compartments 40 and 40a will be described later.

Figure 3:
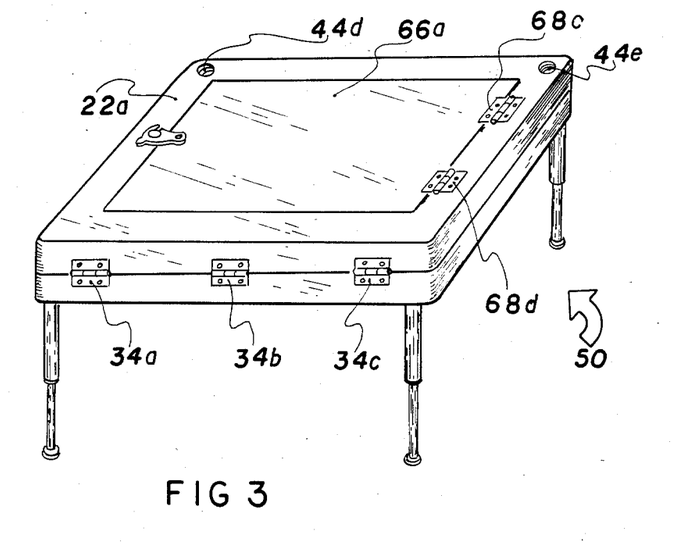
FIG. 3 is a perspective view of a small-size table formed with the use of the portable solar water heater.
Figure 3A:
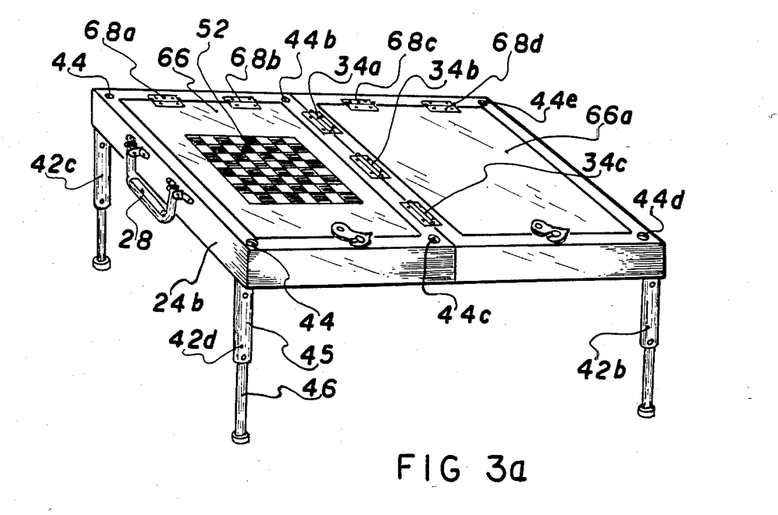
FIG. 3a is a perspective view of a large-size table formed with the use of the portable solar water heater.

The collector may also be converted to either a small table 50 (shown in FIG. 3) or a large table 52 (shown in FIG. 3a). For these purposes, six such recesses as 45 (45, 45a, 45b, 45c on one wall 22 and 45d, 45e on wall 22a) are formed on the outer corners of casing 20 for receiving legs 42a to 42d. With the legs installed in these recesses, solar water heater 20 is converted into a small table 50. Four additional recesses, 45f, 45g, 44h and 45i, are provided on the corners of the frame so that they are exposed only when the casing is open and the solar water heater is installed in its working position. In this case, the bottom surface of the frame of the solar water heater serves as the top for a large-size table. A chessboard 52 or board for any other table game or games may be provided on the top of both tables.

Figure 4:
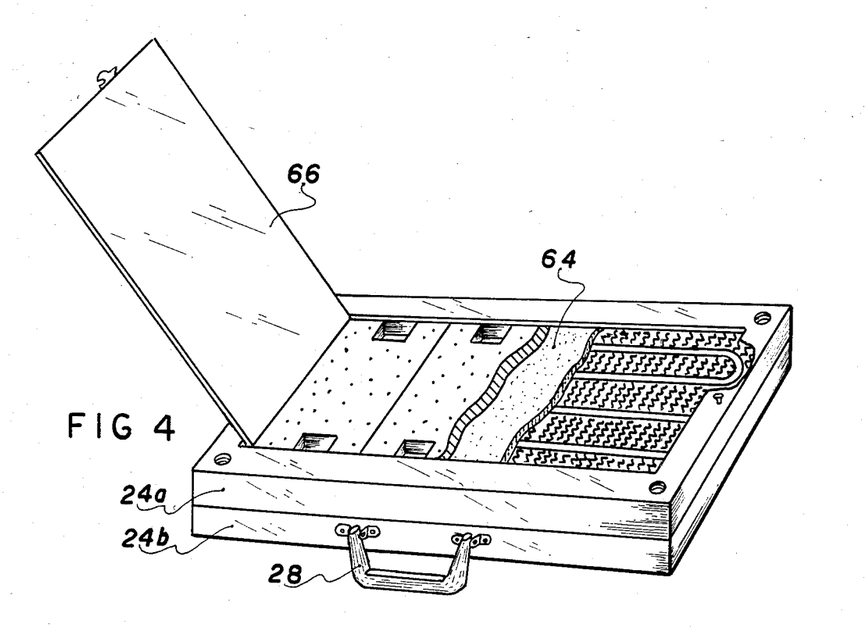
FIG. 4 is a perspective view of the solar water heater with walls of the casing open to show the lower side of the collector and position of the removable thermal insulation layer.

Collectors 38 and 38a will be described further with reference to FIGS. 2, 4, and 5. Each collector is located within the interior of corresponding part 30 and 32 of the casing. Since both collectors 38 and 38a are identical, only one of them (38) will be described. Identical parts of collectors 38 and 38a will be designated with the same reference numerals, but with addition of the suffix "a" to respective parts of collector 38a.

Figure 5:
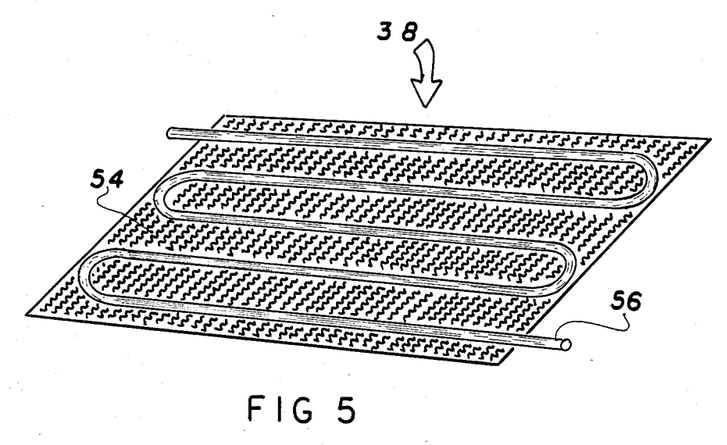
FIG. 5 is a perspective view from the back side of one of the solar collector plates.

As shown in FIG. 5, collector 38 comprises an absorbing surface formed by a copper sheet 54 blackened on the side exposed to sunlight and provided with a coil 56 welded to copper sheet 54 in a heat-transferring manner on the other side of the sheet. Adjacent ends 58 and 58a of both coils are interconnected by a flexible, e.g., plastic, tube 60 (FIG. 7); their outer ends form respectively an inlet union 62 and outlet union 64 of the collector assembly formed by both interconnected collectors 38 and 38a.

Figure 6:
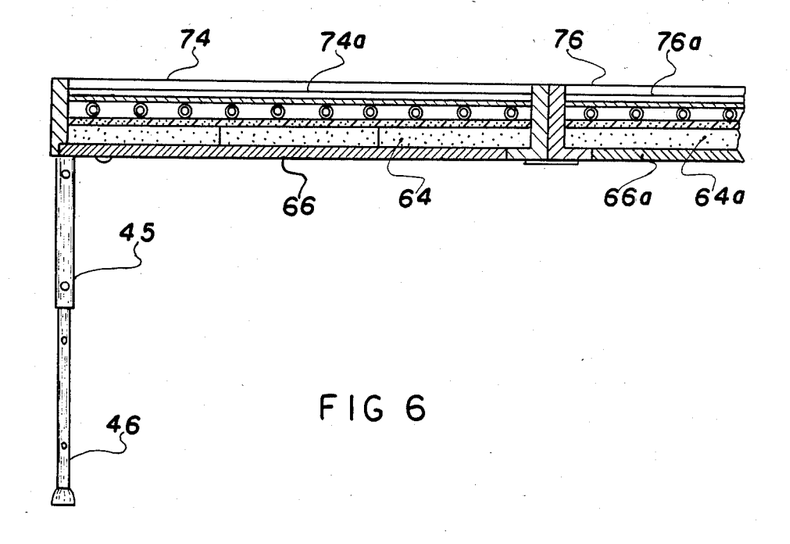
FIG. 6 is a cross-sectional view along lines A—A of FIG. 2.

As shown in FIG. 6, both collectors 38 and 38a are placed onto insulation layers 64 and 64a. Layers 64 and 64a are formed, e.g., of a temperature insulating material such as urethane foam or the like. This material should be rigid since it also serves for another purpose which will be described later. Insulation layers or plates 64 and 64a, in turn, are supported by outer covers 66 and 66a of casing 20. These covers are hinged to the casing at 68a, 68b and 68c, 68d (FIG. 1 and FIG. 4). The same hinged covers (not shown) are provided on the other side of the casing. Covers 66 and 66a (as well as covers on the other side of the casing) can be open (FIG. 4) for access to insulation plates 64, 64a, etc. Each plate consists of at least three separate parts so that six plates in total form the insulation layers of the assembled collector.

When covers 66, 66a and the covers on the other side of the table (not shown) are open, all six parts of the insulation plates can be removed from the casing and assembled into a container 70 shown in FIG. 12. This container, which has sides made of a temperature insulating material, may be used for keeping frozen food or for maintaining water heated by the solar water heater at an elevated temperature. Various means can be utilized for fixing sides 72a, 72b, 72c, 72d, 72e and 72f (only part of them is shown in the drawing) of container 70 into a box-like shape shown in FIG. 12. For example, they may be interconnected by means of groove-and-tongue joints, by Velcro multiple hook and eyelet fasteners, snap fasteners, adhesive tape, or any other quick assembling and disassembling means.

Collectors 38 and 38a are rigidly fixed to halves 30 and 32 of casing 20 by any suitable means (not shown), e.g., by screws, and are covered by one or two spaced layers of a transparent material such as glass or plastic film with a high light-transmission coefficient. Two plastic film layers 74, 74a and 76, 76a are used in the illustrated embodiment. Plastic films are preferable due to their light weight which is essential for portability of the device.

Thus in a working position of the solar water heater of the invention, an assembled collector comprises a heat absorbing surface formed by copper sheets 54 and 54a, a continuous coil formed by copper tubes 56 and 56a interconnected by flexible tube 60, and a transparent cover formed by two spaced plastic films which provide a greenhouse effect.

Figures 7, 8, 9:
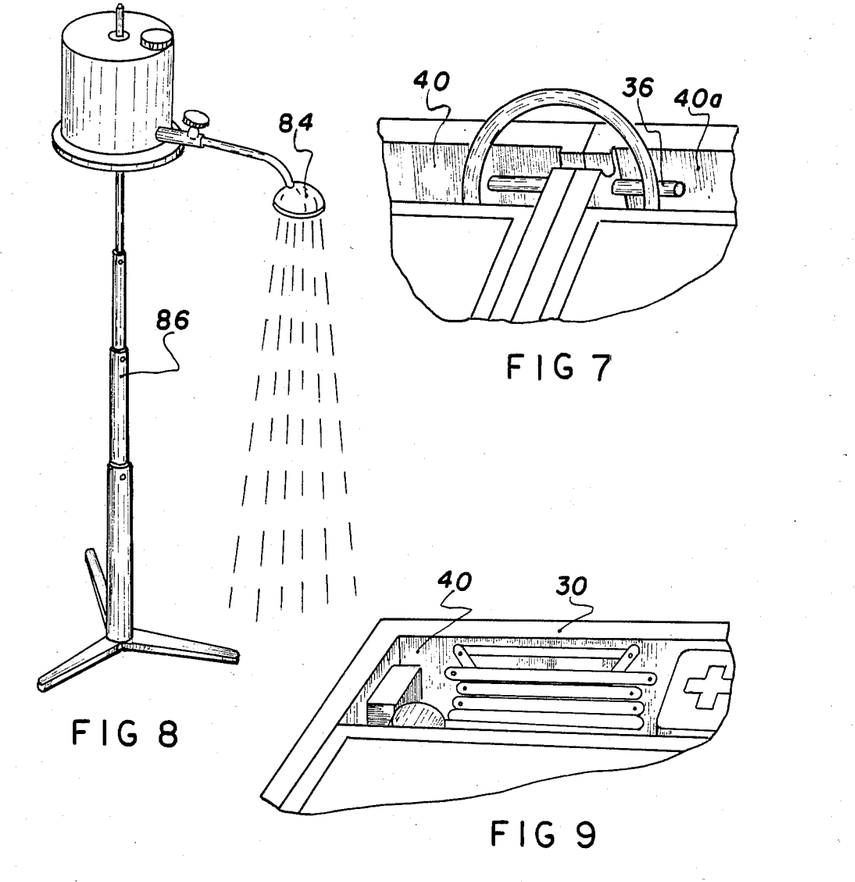
FIG. 7 is a portion B of FIG. 2 shown on a larger scale.
FIG. 8 is a shower kit in its working position.
FIG. 9 is a perspective view of a compartment of the casing for various accessories.
Figure 10:
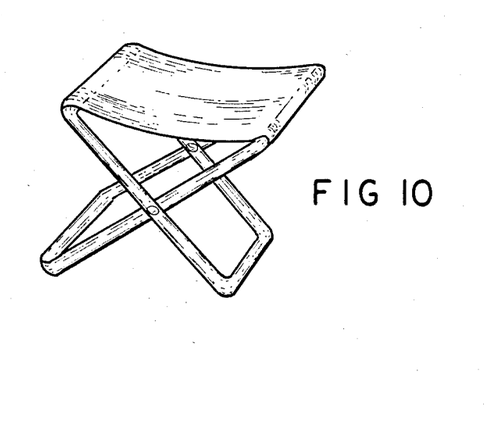
FIG. 10 is a perspective view of a collapsible chair.

As has been mentioned above, casing 20 is provided with compartments 40 and 40a for accessories. These compartments may contain legs 42a, 42b, 42c, and 42d, a collapsible loading container 80 with an upper plug 81 and outlet pipe union 83 which is provided with a shut-off valve 85. A valve 91 is provided on outlet pipe union 64 for controlling the outlet flow from the collector. There is also a receiving container 82 which is identical to loading container and has an upper plug 81a and an outlet pipe union 83a with a shut-off valve 85. Both containers are interchangeable. The device is provided further with a shower head 84, telescopic tripod stand 86, collapsible chair (FIG. 10), or any other necessary item. The positions of these accessories in compartment 40a is shown in FIG. 9. FIG. 8 illustrates shower head 84 attached to the bottom of receiving container 82 filled with water heated by the present solar water heater. The container with hot water is fixed to the upper end of an adjustable tripod stand 86, the latter consisting of telescopic tubes which can be extended and fixed in the extended position. A conventional photographic tripod can be used for this purpose.

OPERATION OF THE SOLAR WATER HEATER

The solar water heater of the present invention can be used for various purposes which will be described hereinafter. First consider its main function as a solar water heater.

In order to use the device of the invention as a solar water heater, casing 20 is opened as a usual suitcase by opening lock 26 and then removing legs 42a, 42b, 42c, and 42d from compartments 40a or 40, depending on where they are located. The legs are screwed into correpsonding threaded holes 44, 44a (FIG. 1), 44d, and 44e (FIG. 3) and the solar water heater assumes the position shown in FIG. 2.

Lock pin 36 is inserted into aligned holes (not shown) of both halves 30 and 32, thereby converting two hinged halves 30 and 32 into an integral rigid frame. Then one pair of legs, i.e., legs 42a and 42b, are extended so as to place the device at an appropriate angle (as close to 90° as possible) to incident rays of solar radiation. Tripod stand 86, loading container 80, and receiving continer 82 are removed from the accessory compartment. Tripod stand 86 is extended into its working position, loading container is fixed to the upper end of tripod stand 86, and the latter is connected to inlet pipe union 62 of the solar collector. Shut-off valve 85 is still closed.

Plug 81a is removed from receiving container 82 and outlet pipe union 64 of the assembled collector is inserted into container 64. In this position, shut-off valve 85a is also closed. Container 80 is filled with cold water, which can be taken from a river, spring, lake, or any other source. Now the solar water heater is ready for use.

To start operation, shut-off valve 85 is opened and water begins to flow from container 80, which is at an elevated level with respect to container 82, through inlet pipe 62, coil 56, connection pipe 60, coil 56a, and outlet pipe union 64 to receiving container 82. On its way through the coils, water is heated by receiving the heat from heat absorbing surfaces formed by sheets 54 and 54a of collectors 38 and 38a, respectively. The efficiency of heating is improved due to the used of two film layers 74, 74a, and 76, 76a which create a "greenhouse effect". The temperature of heated water may be controlled by adjusting the flow at the output from the collector by means of valve 91. It also will depend on weather conditions, geographic location, size of the collector, temperature of cold water in supply container 80, and many other factors. Tests of an experimental solar water heater of the present invention showed the following results:

Location: Palo Alto, Calif.
Weather conditions: sunny day, mild wind.
Temperature of air: 21° C.
Time: 1 p.m., July 1984
Temperature of feed water: 11° C.
Temperature of outlet water: 57° C.
Flowrate: 24 liters per hour.

If one wants to take a shower, he or she may replace container 80 with container 82 which is now filled with warm or hot water. This position is shown in FIG. 8. Shower head 84 in this case is attached to outlet pipe union 83a.

The hot water may be used for any other purpose or stored within temperature insulating box 70 formed by urethane foam plates 72a, 72b, 72c, etc., which are removed for this purpose from casing 20 through covers 66, 66a.

If desired, the solar water heater of the present invention can be used as a small-size table or a large-size table. In the case of a small-size table, legs 42a, 42b, 42c, and 42d are removed from the accessory compartment, casing 20 is closed and locked, and the legs are inserted into threaded holes 44, 44a, 44b, and 44c respectively. This small-size table is shown in FIG. 3. In order to convert the solar water heater into a large-size table, casing 20 is opened, lock pin 37 is inserted into aligned holes of both halves 30 and 32 and legs 42a, 42b, 42c, and 42d are inserted into corner holes 44f, 44g, 44h, and 44i (FIG. 2). The large-size table is shown in FIG. 3a. It can be used for any purpose and provided also with a chessboard or board for any other game.

For storage or transportation, the solar water heater can be easily converted into position shown in FIG. 1 by disconnecting and collapsing legs and other accessories and placing them in their respective compartments. Also urethane foam plates of box 70 are disassembled and located under collector plates through hinged covers 66 and 66a.

Figure 13:
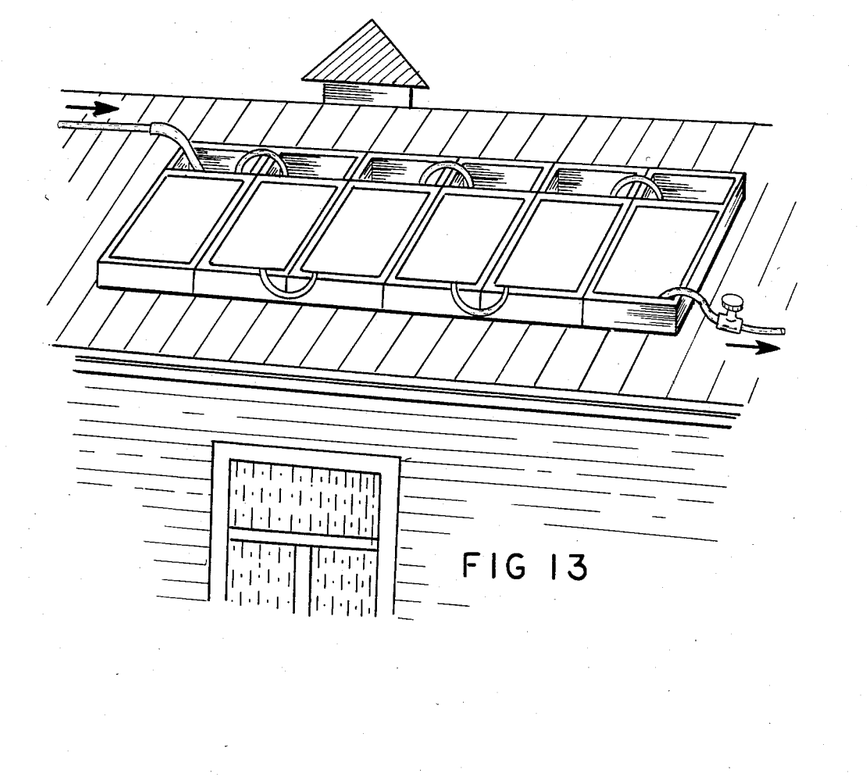
FIG. 13 is a perspective view illustrating the use of a collector assembled of several units in a domestic solar water heating system.

Several foldable portable solar water heaters of the present invention can be connected in series to form a conventional domestic water heating system. As shown in FIG. 13, three such solar water heaters 100a, 100b, and 100c of the type shown in FIGS. 1 to 12 are connected in series by means of pipes 102 and 104 to form an integral solar collector which is used in a conventional active or passive-type water heating system (not shown in the drawings). Reference numerals 106 and 108 designate an input into the collector and output from the collector respectively. The system which may consist of a storage tank, pump, automatic temperature control unit, and piping is conventional and need not be described in the present application.

The assembled collector shown in FIG. 13 can be connected through pipe 106 to a conventional running water system (not shown) and through pipe 108 to a thermally-insulated storage tank (not shown) without the use of a water circulation system. In this case, a water heating system is provided which can be quickly and easily assembled on the roof without special skill.

The use of a solar collector formed of the portable solar water heaters of the present invention is advantageous in that it can be quickly and easily assembled for temporary use. If necessary, one of the units can be disconnected and used as a table or as a portable solar water heater in any other location.

The invention has been described in the form of its preferred embodiment. It is obvious, however, that many other modifications and applications of the combined table and portable solar water heater of the present invention are possible. For example, three or more solar panels can be assembled by hinges into a fanfold arrangement, the casing can be made of a plywood, or it may be molded from plastic or assembled from plastic, wooden, or metal parts. Material other than urethane foam can be used for the insulation layer, one film layer may be used in the collector, or a layer of glass may be combined with a layer of film. There may be two layers of thermal insulation: one permanent layer made of a heat-resistant plastic and another removable layer made of a rigid urethane foam and used for assembling a heat-insulating container. Various accessories such as a medicine chest, thermometer, camera, etc., can be placed into accessories compartments. Tripod 86 can be used as a conventional tripod stand for a photographic or movie camera. Although the domestic solar water heating system was illustrated as composed of three separate foldable portable solar water heaters connected in series, it is should be understood that any number of such units can be connected in series, in parallel or in a series-parallel combination, according to particular conditions and requirements. Therefore the scope of the invention should be determined, not by the examples given but by the appended claims and their legal equivalents.

We claim:

1. A portable solar water heater comprising:
a pair of solar collector panels,
a corresponding pair of rigid casings,
each panel being mounted in a respective casing,
each casing comprising a substantially flat, rigid panel, one side of which is substantially flat, its respective solar panel being joined to the other side of such panel,
means for joining said two panels together for transportation such that said solar panels are adjacent each other in a face-to-face relationship and such that said one sides of said panels face outward and away from each other, and
means for enclosing the side edges of said panels and their solar collector when said panels are joined together.

2. A portable solar water heater according to claim 2 wherein said means for enclosing comprises four side and end frame members joined perpendicularly to the edges of each panel so as to form an open-box configuration.

3. A portable solar water heater according to claim 2 wherein said casing panel is substantially larger than said solar panel so as to provide a storage compartment in said casing adjacent said panel.

4. A portable solar water heater according to claim 1, further including a removable panel of insulation in one of said casings, adjacent its solar collection panel.

5. A portable solar water heater according to claim 1, further including a transparent cover over said solar panel such that said solar panel is sandwiched between said casing panel and said transparent cover.

6. A portable solar water heater according to claim 1, further including a flexible tube connecting said two solar panels together and two tubular connectors on each of said solar panels, said tube extending between two of said connectors.

7. A portable solar water heater according to claim 1 wherein said means joining said two panels together comprises a hinge joined to the side of each of said panels and means for locking said panels together at the opposite sides of said panels.

8. A portable solar water heater according to claim 7, further including means for locking said casings in a coplanar fashion in an open state such that both solar panels face in the same direction, and means for supporting said casings, when locked in a coplanar fashion, at an angle to the ground such that said solar panels can be made to face the sun.

9. A portable solar water heater according to claim 8, further including means for supporting said casings, when locked in a coplanar fashion, spaced from and parallel to the ground, with said solar panels facing the ground, such that said locked casings can be used as a table.

10. A combined table and solar water heater comprising: a collapsible casing, a solar collector with inlet and outlet means in said casing; at least a pair of containers in said casing for feeding liquid to be heated by said solar collector and for receiving liquid heated by said solar collector respectively; supporting means for one of said containers; and supporting means for enabling said casing means to be converted into a table by attaching it to said casing.

11. A combined table and portable solar water heater according to claim 10 wherein said collapsible casing is provided with at least one compartment for retaining said containers and said casing supporting means.

12. A combined table and portable solar water heater according to claim 10 wherein said casing is molded from a rigid plastic material.

13. A combined table and portable solar water heater according to claim 10 wherein said casing is stamped from a light aluminum alloy sheet.

14. A combined table and portable solar water heater according to claim 10 wherein said casing is made of wood.

15. A combined table and portable solar water heater according to claim 10 wherein said container supporting means comprises a collapsible tripod formed by a plurality of pipes telescopically inserted one into another with through holes in their walls, and a plurality of lock pins which can be inserted into holes when they are in aligned positions, whereby the height of said tripod can be adjusted.

16. A combined table and portable solar water heater according to claim 10 wherein said casing supporting means comprises collapsible legs formed by a plurality of pipes telescopically inserted one into another with through holes in their walls and a plurality of lock pins which can be inserted into holes when they are in aligned positions, whereby the height of said legs can be adjusted, said casing being provided with means for attachment of said legs to convert said casing into a table.

17. A combined table and a portable solar water heater according to claim 10 wherein said opening casing means comprises two hinged halves made of rigid material and are provided with locking means for locking both halves in a storage or transportation position of said portable solar water heater, said collector means comprising a pair of collector units connected in series with each other, each being located in one of said halves.

18. A combined table and a portable solar water heater according to claim 17 wherein each of said collector units is formed of a plate, the exposed surface of which comprises a solar radiation absorbing surface, a pipe coil being attached to the other side of said plate in heat-transferring relationship to said absorbing surface, a layer of temperature insulating material being located between said other side of said plate and the inner surface of walls of said casing, and a layer of transparent media which covers said collector from it exposed side and is spaced therefrom at a predetermined distance.

19. A combined table and a portable solar water heater according to claim 18 wherein said layer of temperature insulating material comprises a rigid plastic plate composed of a plurality of pieces, and said walls of said casing being formed by hinged covers with locks so that said covers can be open from outside for removing said pieces from said casing, said pieces being provided with attachment means whereby said pieces can be assembled into a temperature insulating container of a size capable to retain one of said containers filled with liquid heated by said solar water heater.

20. A combined table and portable solar water heater comprising: a rigid casing formed by a pair of hinged halves with locking means and a handle; a solar collector in each of said halves, said collector consisting of a solar radiation absorbing surface on the exposed side of a plate made of a material having high temperature conductivity and a pipe coil on the other side opposite to said exposed side, said coil being in a temperature-transferring relationship with said plate, a temperature-insulating layer between said opposite side and the inner surface of the wall of said casing, said wall being hinged to the frame of said casing and being provided with locking means for closing and opening said wall in order to provide access to said temperature-insulating layer, said layer consisting of a plurality of separate membranes, each of which is smaller than the opening formed by said wall in its open position; at least one layer of a transparent material such as a plastic film which is spaced from said exposed surface of said collector and covers said exposed surface to seal said space between the transparent material and said exposed surface, both of said collectors being interconnected in series by a flexible pipe, said casing being provided with at least one compartment for accessories, at least four legs for supporting said solar water heater, means in said casing for attachment of said supporting legs to said casing, at least a pair of collapsible containers made of a water-impermeable material, means for supporting one of said collapsible containers at an elevated level with respect to said collectors, means in said casing for rigidly interconnecting said halves into an integral rigid frame in an open position of said casing, whereby said legs and said container supporting means can be retained, during transportation and storage of said solar water heater, in said compartment for accessories, and inlet means on one of said collectors and outlet means on the other of said collectors.

21. A combined table and portable solar water heater according to claim 11 wherein said container supporting means comprises a collapsible tripod formed by a plurality of pipes telescopically inserted one into another with through holes in their walls, and a plurality of lock pins sized to be insertable into said holes when they are in aligned position, whereby the height of said tripod can be adjusted.

22. A combined table and portable solar water heater according to claim 20 wherein said supporting legs are formed by a plurality of pipes telescopically inserted one into another with through holes in their walls and a plurality of lock pins which can be inserted into said holes when they are in aligned positions, whereby the height of said legs can be adjusted, said casing being provided with means for attachment of said legs to convert said casing into a table.

23. A combined table and portable solar water heater according to claim 20 further including a shower head and at least one collapsible chair retained in said compartment for accessories.

* * * * *